(12) United States Patent
May

(10) Patent No.: US 10,036,673 B2
(45) Date of Patent: Jul. 31, 2018

(54) COMPENSATION METHODS FOR ACTIVE MAGNETIC SENSOR SYSTEMS

(71) Applicant: Torque And More (TAM) GmbH, Starnberg (DE)

(72) Inventor: Lutz May, Berg (DE)

(73) Assignee: TORQUE AND MORE (TAM) GMBH, Starnberg (DE)

( * ) Notice: Subject to any disclaimer, the term of this patent is extended or adjusted under 35 U.S.C. 154(b) by 536 days.

(21) Appl. No.: 14/443,603

(22) PCT Filed: Dec. 12, 2013

(86) PCT No.: PCT/EP2013/076460
§ 371 (c)(1),
(2) Date: May 18, 2015

(87) PCT Pub. No.: WO2014/090970
PCT Pub. Date: Jun. 19, 2014

(65) Prior Publication Data
US 2015/0323397 A1   Nov. 12, 2015

(30) Foreign Application Priority Data

Dec. 14, 2012 (EP) .................................. 12197269
Jun. 21, 2013 (EP) .................................. 13173284

(51) Int. Cl.
*G01L 1/12* (2006.01)
*G01L 3/10* (2006.01)

(52) U.S. Cl.
CPC .............. *G01L 1/127* (2013.01); *G01L 1/125* (2013.01); *G01L 3/102* (2013.01)

(58) Field of Classification Search
CPC ...... G01R 33/02; G01R 33/025; G01R 33/04; G01R 33/06; G01R 33/0385; G01R 33/028–33/0286; G01L 1/127
See application file for complete search history.

(56) References Cited

U.S. PATENT DOCUMENTS 4,414,856 A    11/1983  Winterhoff
4,566,338 A *  1/1986   Fleming .................. G01L 3/102
                                                       324/209
(Continued)

FOREIGN PATENT DOCUMENTS

EP     0046517     3/1982
JP     S61-201126  9/1986
(Continued)

*Primary Examiner* — Erika J Villaluna
(74) *Attorney, Agent, or Firm* — Fay Kaplun & Marcin, LLP

(57) ABSTRACT

Active Force measuring device for measuring a force impact onto a ferromagnetic object comprising a flux concentrator having a first and second ends facing the ferromagnetic object to me measured, a magnetic field generation coil arrangement being wound around the flux concentrator, wherein the magnetic field generating coil arrangement is adapted for generating a magnetic field having a main generating direction between the first end and the second end, and a magnetic field sensing arrangement, wherein the magnetic field sensing arrangement is arranged between the first end and the second end.

19 Claims, 6 Drawing Sheets

(56) References Cited

U.S. PATENT DOCUMENTS

| | | | | | |
|---|---|---|---|---|---|
| 4,716,773 | A | * | 1/1988 | Nonomura | G01L 3/102 |
| | | | | | 324/209 |
| 5,168,223 | A | * | 12/1992 | Le Thiec | G01R 33/045 |
| | | | | | 324/253 |
| 5,269,178 | A | | 12/1993 | Vigmostad et al. | |
| 2004/0107777 | A1 | * | 6/2004 | Lequesne | G01L 1/125 |
| | | | | | 73/779 |

FOREIGN PATENT DOCUMENTS

| | | | | |
|---|---|---|---|---|
| JP | S61201126 | | 9/1986 | |
| JP | 06307948 | A * | 11/1994 | |
| JP | 08285706 | A * | 11/1996 | G01L 3/102 |
| WO | 2012/152720 | | 5/2012 | |
| WO | 2012/152720 | | 11/2012 | |

\* cited by examiner

COMPENSATION METHODS FOR ACTIVE MAGNETIC SENSOR SYSTEMS

FIELD OF THE INVENTION

The present invention relates to a device for active magnetic sensing, and in particular to a device and a method for compensating influences of e.g. stray fields, movements and other magnet fields in active magnetic sensor systems.

BACKGROUND OF THE INVENTION

Measuring forces is a challenge, as the environment of the measurement may provide a lot of disturbing effects. When using an active mechanical force sensor on a test object that is moving or rotating, then the remaining (not degaussed) magnetic fields, inside this test object will e.g. cause a continuous modulation of the actual measured force signal. There are a number of solutions that can be applied to deal with this unwanted issue. One of these solutions may be making sure that the test object has been degaussed properly before using the sensor device. The challenge here will be that when the test object becomes very large and therefore heavy, it becomes increasingly more difficult to achieve the quality of de-magnetization (or degaussing) with an increasing size of the test object. The electrical energy required to degauss properly e.g. a wind turbine shaft is so big that it is no longer practical or payable to degauss such objects. Alternatively, it may be possible to use a low frequency band pass filter applied to the measured force signals. This may result in an unacceptable slow reaction time of this mechanical force sensor signal. As a further alternative, a pattern recognition and pattern compensation method may be used as used in noise cancellation systems. This however is a solution having a high complexity, more costly solution, and not applicable to applications where there is no predictable, or repeatable, or reliable movement pattern of the test object. All of these solutions require additional work planning, additional processing steps before using the sensor, and require great care before and when using an active mechanical force sensor.

SUMMARY OF THE INVENTION

It would be desireable to provide an improved device and method for active magnetic sensing.

The invention provides a method and device for active magnetic sensing according to the subject matter of the independent claims. Further embodiments are incorporated in the dependent claims.

It should be noted that the following described exemplary embodiments of the invention apply also for a corresponding method, the device, a program element and a computer readable medium.

According to an exemplary embodiment there is provided a force measuring device for measuring a force impact onto a ferromagnetic object, the force measuring device comprising a flux concentrator having a first end and a second end, the first end and the second end facing the ferromagnetic object to be measured, a magnetic field generation coil arrangement being wound around the flux concentrator, wherein the magnetic field generating coil arrangement is adapted for generating a magnetic field having a main generating direction between the first end and the second end and a magnetic field sensing arrangement, producing a measurement signal being indicative for a force applied to the object to be measured, an evaluating unit for evaluating a sensing signal of the magnetic field sensing arrangement, wherein the evaluating unit comprises a first branch for entering the sensing signal of the magnetic field sensing arrangement, the first branch having a first filter having a passing characteristic matching the generating current frequency driving the magnetic field generation coil arrangement, and a subsequent signal processing unit for evaluating the sensing signal in view of the applied force to the ferromagnetic object to be measured.

Thus, a compensation of unwanted impacts onto a force measurement signal can be avoided. The signal quality can be significantly increased.

According to an exemplary embodiment the magnetic field sensing arrangement comprises a magnetic field sensing coil being arranged between the first end and the second end, wherein the measuring signal is gained from terminals of the magnetic field sensing coil.

Thus, it is possible to detect the forces applied to the object to be measured.

According to an exemplary embodiment the force measuring device further comprises a distance sensing coil arrangement, being adapted to sense a distance between the force measuring device and the object to be measured, so that a measured force signal can be distance compensated.

According to an exemplary embodiment, the distance sensing arrangement having a first distance sensing coil and a second distance sensing coil, wherein the first distance sensing coil is wound around the flux concentrator and being arranged at the first end of the flux concentrator, and the second distance sensing coil is wound around the flux concentrator and being arranged at the second end of the flux concentrator.

Thus, it is possible to consider the distance between the force measuring device and the object to be measured. As the measured signal may vary with the distance, the distance can be determined so that the influence of the distance can be compensated. The distance may also vary over the time due to e.g. thermal expansion. The distance measurement allows compensating this.

According to an exemplary embodiment, the distance sensing coil arrangement is arranged between the first end and the second end of the flux concentrator.

Thus, a direct impact onto the field lines between the both pole ends of the flux concentrator can be detected and sensed.

According to an exemplary embodiment the magnetic field sensing arrangement has a main detecting direction being inclined to the main generating direction.

Thus it is possible to detect the signal components and to compensate for the generated magnetic field.

According to an exemplary embodiment the magnetic field sensing arrangement has a main detecting direction being inclined by 90° to the main generating direction and a facing direction.

Thus it is possible to more or less fully compensate the generated magnetic field between the both ends of the flux concentrator. The magnetic field sensing arrangement thus may detect only the field components being generated by the applied forces. The sensor device becomes more sensitive and less influenced by the generated magnetic field.

According to an exemplary embodiment the magnetic field sensing arrangement is a fluxgate circuit having a core material of a permeable amorphous elongated element.

Thus, a material for the core is provided which allows particular frequencies, and allows a sufficient detection quality.

According to an exemplary embodiment the relative permeability of the permeable amorphous elongated element is above 10000, preferably above 50000, preferably between 70000 and 100000.

Thus, it is possible to provide a good sensitivity of the permeable amorphous elongated element.

According to an exemplary embodiment, the magnetic field sensing arrangement is a magnetic field sensing shunt resistor being connected in series to the magnetic field generation coil arrangement, wherein the measuring signal is gained from terminals of the magnetic field sensing shunt resistor.

Thus, the magnetic field sensing arrangement between the ends of the flux concentrator can be omitted so that the legs of the flux concentrator may be kept short. This allows a low build up for applications with a low space around the object to be sensed.

According to an exemplary embodiment the force measuring device further comprises a generating coil driving unit being adapted for driving the magnetic field generating coil arrangement with a current having a frequency above a frequency where eddy currents occur in the ferromagnetic object to be measured.

Thus, it is possible to avoid significant losses in the object to be measured and also a high energy consumption of the active measuring device.

According to an exemplary embodiment the frequency of the current is higher than 600 Hz, preferably higher than 1000 Hz, preferably higher than 4000 Hz, preferably between 6000 Hz and 10000 H.

Thus, the losses owing to eddy currents can be substantially avoided. With these frequency ranges no eddy currents are expected in ferromagnetic objects to be measured.

According to an exemplary embodiment the signal processing unit comprises a true root mean square (RMS) converter into which the filtered signal enters, a reference voltage source for providing a reference voltage corresponding to the force free measurement signal, and a subtracting amplifier subtracting the reference voltage from an output of the true root mean square (RMS) converter.

Thus, it is possible to compensate for the influences of the magnetic field being generated by the magnetic field generating coil. The filter may avoid a respective noise in the measured signal, so that the signal to noise ratio may be improved.

According to an exemplary embodiment the evaluating unit comprises a second branch for entering the sensing signal of the magnetic field sensing arrangement, the second branch having a second filter having a low pass characteristic matching a frequency of a permanent magnetic field of the ferromagnetic object to be measured and a subsequent signal processing unit for evaluating the sensing signal in view of the permanent magnetic field of the ferromagnetic object to be measured.

Thus, influences of a permanent magnetic field of the object to be measured can be compensated, in particular if the object to be measured moves.

According to an exemplary embodiment the low pass filter characteristic of the second filter matches a rotation frequency of the ferromagnetic object to be measured.

Thus, a permanent magnetic field, being transformed into an alternating magnetic field by rotation of the object to be measured, can be compensated. This applies in particular for rotating shafts.

According to an exemplary embodiment the evaluating unit comprises a third branch for entering a distance sensing signal of the distance sensing coil arrangement, the third branch being adapted to evaluate the distance of first end and the second end, respectively, to the ferromagnetic object to be measured.

Thus, a varying distance may be considered for compensating. The measured signal may be stronger or weaker when varying the distance. As this may influence the result of the determination of the applied force significantly, the influence resulting from a varying distance can be compensated.

According to an exemplary embodiment the evaluation unit is adapted to determine an applied force to the ferromagnetic object to be measured based on an evaluation result of the first branch and at least one evaluation result of the second branch and the third branch.

Thus, the evaluation unit is capable of considering the main disturbances influencing the measuring signal. The main disturbances may be compensated, namely the magnetic field of the magnetic field generator, the internal magnetic field of the object to be measured, the stray fields, and the influences of the distance between the object to be measured and the measuring device.

According to an exemplary embodiment the force measuring device further comprises an amplitude demodulation unit coupled to the first branch and the second branch, and optionally to the third branch for amplitude demodulation, wherein the amplitude demodulation unit is adapted to provide a signal for further signal processing.

Thus, the measured signal may be prepared for further processing, which may include the determination of the applied force to the object to be measured.

According to another exemplary embodiment the flux concentrator can be arranged traverse to the object to be measured, in particular so that a longitudinal axis of the object and the orientation of the flux concentrator include an angle larger than 0 deg up to 90 deg.

Thus, a parallel orientation is suitable to measure torque forces and will almost completely suppress the effects caused by bending forces. The traverse orientation is suitable to measure bending forces and will almost completely suppress the effects of applied torque forces, when having an orthogonal traverse orientation.

According to another exemplary embodiment, as a magnetic field sensing arrangement in addition to the magnetic field generating coil arrangement a magnetic field sensing coil may be wound around the flux concentrator. According to an exemplary embodiment, the magnetic field generating coil and the magnetic field sensing coil, both being wound around the flux concentrator, may have a common terminal.

Thus, energy dissipation within the test object can be detected by the sensing coil that has been wound onto the same flux concentrator as the generator coil. The sensor signal can now be detected by monitoring the signal amplitude changes at the sensing coil. Instead using a voltage drop resistor or shunt resistor the sensor signal can now be detected by monitoring the signal amplitude changes at the sensing coil. According to an embodiment this can be realized as a three wire sensing module solution by connecting a middle tap wire (common joint connection). Effectively it is possible to use one and the same coil by connecting a middle tap wire that may be connected to signal ground for example. From the manufacturing point of view this is one coil design, which may be simpler to produce. According to another exemplary embodiment, the both coils, the generator coil and the sensing coil may have separate terminals, as a so called four wire solution. For both, the three and the four wire solution it is also possible to wind the two coils on top of each other. The sensing module signal output is the voltage amplitude change that can be measured at the sensing coil.

It may be seen as a gist of the present invention to provide a device and a method for compensating the main influences onto a measured signal for determining an applied force to an object to be measured. The alternating magnetic field (which essentially is a form of energy) travels through the flux concentrator into the surface of the test object and from there again back into the flux concentrator. Depending on the mechanical stress that is applied to the test object, the magnetic energy flow will be modulated, meaning that with a high mechanical stress applied a higher amount of energy will be dissipated by the test object. In reverse, when the test object is in a relaxed condition (no mechanical stress applied) then the energy dissipation in the test object is at its lowest level (assuming that all the other conditions are kept constant or identical). In case the signal generator (in this specific sensing module design example) is operating with a constant output voltage, a higher or lower magnetic energy dissipation in the test object results in a modulation of the electric current flow through the magnetic field sensing arrangement.

It should be noted that the above features may also be combined. The combination of the above features may also lead to synergetic effects, even if not explicitly described in detail.

These and other aspects of the present invention will become apparent from and elucidated with reference to the embodiments described hereinafter.

BRIEF DESCRIPTION OF THE DRAWINGS

Exemplary embodiments of the present invention will be described in the following with reference to the following drawings.

DETAILED DESCRIPTION OF EXEMPLARY EMBODIMENTS

The active mechanical force sensor technology is capable to measure mechanical forces that are applied to a test object or object to be measured. In the following this sensing technology will be called active sensor, active sensing technology or active mechanical force sensor and is capable measure the following mechanical forces: torque, bending in x- and in y-direction (direction of the beam is the z-direction), shear forces and axial load.

Figure 1:
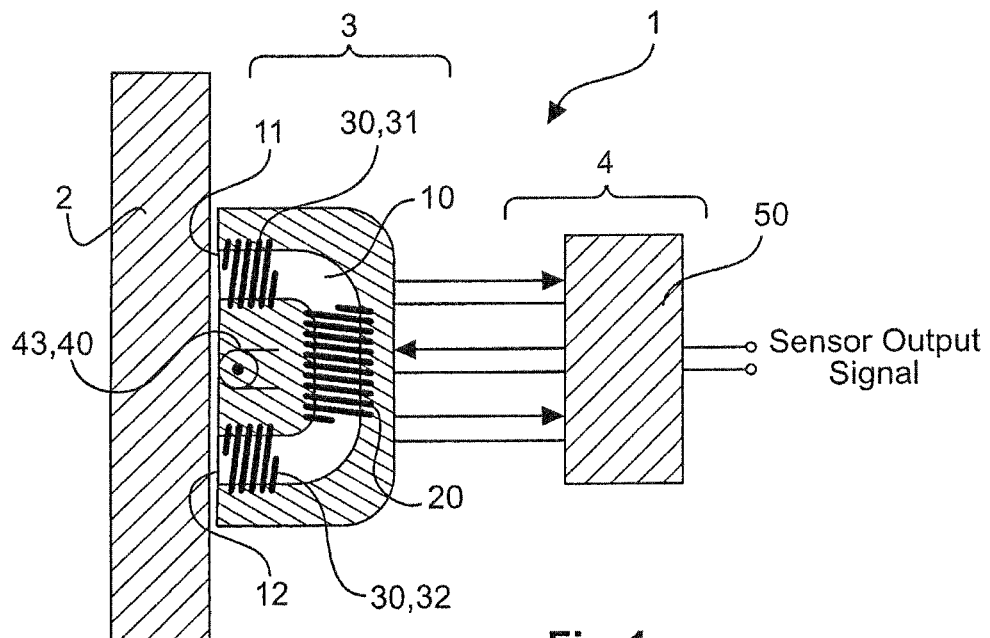
FIG. 1 illustrates an exemplary embodiment of an active sensing module.

FIG. 1 illustrates one of several design options for an active sensing module 3. The active mechanical force sensor 1 comprises an active sensing module 3 that will be placed nearest the test object 2, where the measurements should be taken from, and the sensor electronics 4, also called evaluation unit. The sensor electronics 4 is connected to the active sensing module 3 by a number of wires. The sensor electronics 4 can be placed together with the active sensing module 3 in the same housing (not shown). The active sensing module 3 and the sensor electronics 4 or evaluation unit can also be arranged in separate housings. In this case the both units may be connected by wires or even by a wireless connection.

The active sensing module 3 in this embodiment is connected to the sensor electronics 4 by a number of wires. Together, the sensing module 3 and the electronics 4 then form the active mechanical force sensor 1. The "active" sensing technology relies on a test object or object to be measured 2 (like a power transmitting shaft or a drill shaft) been tooled from ferro magnetic materials. In simple terms, the chosen test object is suitable to work with the active mechanical force sensing technology, as long as a permanent magnet will be attracted by the test object material. In case the material used for the test object has a magnetic retention property, which means that this material can be temporarily or permanently magnetized. In this case it may be possible that the magnetic domains of this material are structured or oriented intentionally or unintentionally in some preferred directions. In simple terms, the test object material is not degaussed.

Such preferred or structured orientation of a certain portion of the magnetic domains within the test object will cause that a relatively weak magnetic pattern can be detected and measured at the surface of this test object, e.g. in the area of +/−5 Gauss, for example. In case this low level and random patterned magnetic field has not been degaussed before applying a standard active mechanical force sensing device, then the magnetic signals expected by the active mechanical force sensing device will be altered and modulated. The signal alteration and signal modulation will increase proportional with the increasing strength of the left over magnetic fields that may be stored intentionally or unintentionally within the test object.

The present invention allows a sensor design solution that can compensate in real time, for the unwanted effects of the left over magnetic fields that can be found in test objects that have not been degaussed before using an active mechanical force sensor.

Measurements can be conducted on static objects as well as moving, in particular rotating objects, so that the active mechanical force sensor can be applied to stationary and to rotating test objects. This means that the measurement will be taken from either an object that is not moving or from objects that either move or rotate with a certain speed and into a certain direction. When the test object remains static, so that it is not moving in relation to the active sensor device, then the measurement signal will show a one time and permanent signal offset in relation to the unintentionally remaining magnetic field that may be stored in the test object material. In this specific case the solution to this issue to correct the measurement signal may be a onetime offset calibration.

In some cases it may happen that the magnetic field that may have been stored, unintentionally inside the test object will weaken over time whereby such "time" can be seconds, hours, or days, or even longer. Therefore the signal offset possibly has to be corrected/calibrated more than one time.

Measurements can also be taken on moving or rotating objects. When using the active mechanical force sensor on a test object that is moving or rotating, then the remaining (not degaussed) magnetic fields, inside this test object will cause a continuous modulation of the actual measured force signal.

There are a number of solutions that can be applied to deal with this unwanted issue. These may be making sure that the test object has been degaussed properly before using the active sensing device. The challenge here will be that when the test object becomes very large and therefore heavy, that it becomes increasingly more difficult to achieve the quality of de-magnetisation (or degaussing) the larger the test object becomes. The electrical energy required to degauss properly a wind turbine shaft is so big that it is no longer practical or payable to degauss such objects. Applying an ultra low frequency band pass filter to the measured force signals may result in an unacceptable slow reaction time of this mechanical force sensor signal. Pattern recognition and pattern compensation method (as used in noise cancellation systems) may be of high complexity, more costly, and not applicable to applications where there is no predictable, or repeatable, or reliable movement pattern of the test object.

All of these solutions require additional work planning, additional processing steps before using the sensor, and require great care before and when using an active mechanical force sensor.

The present invention provides a practical solution that will compensate in real time for the unwanted effects caused by the remaining magnetic fields that may be stored in the test object. This inventive solution does not require any changes to the test object or to the active sensing device. It is entirely applied to the sensors electronics. When having applied this inventive compensation method, then the active mechanical force sensor will be insensitive to most common types of interfering magnetic fields that may be stored intentionally or unintentionally in the material of the test object. In addition it makes the active sensor insensitive to interfering magnetic fields that may come from the bearing balls or gear wheel teeth when placed near a bearing or in a gearbox, for example. As supporting information to the above, the distance compensation of the active sensor system has been described with some more details as both, magnetic stray field and distance compensation require a similar type of signal amplitude demodulation techniques. The present invention further provides a practical solution to compensate for the unwanted interference effects, caused by potential movement and rotation of the test object 2 in relation to the active sensor module 3.

The present invention provides a compensation solution. For this purpose, the sensing module 3 of the active mechanical force sensor comprises an array of magnetic field generator coils 20, feedback coils and the magnetic field sensing (MFS) device 40. A magnetic field sensing device 40 can be a Hall effect sensor, magneto resistive (MR), giant magneto resistive (GMR) device, or a flux gate circuit. Other magnetic field sensor (MFS) technologies are applicable as well as long as they are capable to measure the magnetic field strength in absolute terms. For example the magnetic field sensing arrangement may be a shunt resistor being connected in series with the generating coil arrangement 20, as will be illustrated with respect to FIGS. 5, 6 and 8. In FIG. 1 the magnetic field sensing arrangement is realized as a coil 43. For distance measuring purposes a distance sensing coil arrangement 30 may be provided. The distance sensing coil arrangement 30 may comprise a first and second distance coil 31, 32. The coils 20 and 30, in particular coils 31 and 32 are wound around a flux concentrator 10. All the above described elements can be provided in a single housing so as to form the sensing module 3. The components can also be cast into a resin so as to provide a robust sensor module 3. The pole shoes 11, 12 of the flux concentrator 10 may be concave so as to follow a shape of a rotating shaft as object 2. It should be noted that the pole shoes can also be inclined for the same purpose. The sensing module 3 may be connected to sensor electronics 50. The sensor electronics may operate as an evaluation unit and may output a sensor output signal being indicative for the applied force. The sensor electronics may include a look up table in form of a data base or in form of an algorithm, so as to provide an output signal being proportional to the applied force.

Figure 2:
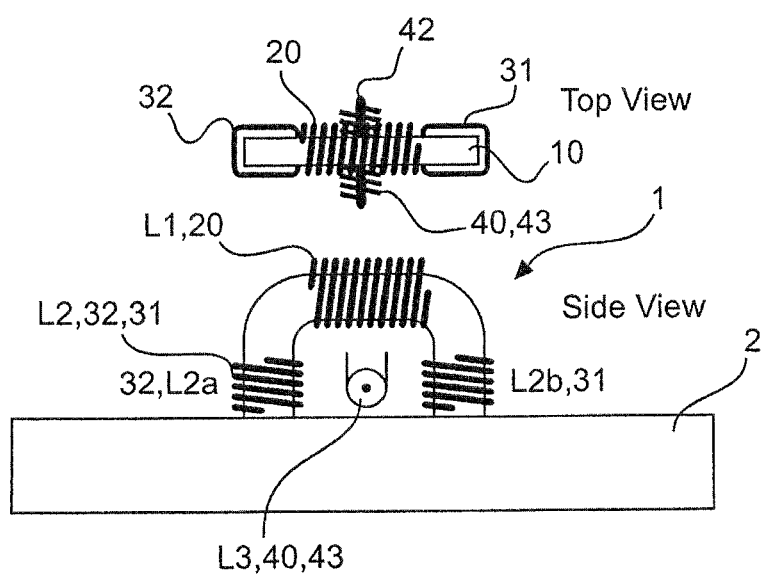
FIG. 2 illustrates a schematic illustration of an exemplary active sensing module in a side view (bottom) together with an object to be measured and a top view (top) without an object to be measured.

FIG. 2 illustrates a top view (top) without object 2 and a side view (bottom) with object 2. The here described sensing module 3 of the active mechanical force sensor 1, comprises of a number of passive electrical components, namely inductors or coils. For improved performance reasons, there is provides a distance sensing coil arrangement 30. This distance sensing coil arrangement may have for example a distance sensing coil, also denoted as L2. The distance sensing coil arrangement according to an embodiment of the invention may comprise two separate coils that are connected in series. In this embodiment the distance sensing coil arrangement 30, will be formed by L2=L2a+L2b, wherein L2a is a first distance coil 31 and L2b is a second distance coil 32. In case of the magnetic field sensing coil arrangement 40, 43 between the pole ends 11, 12 of the flux concentrator 10, an alternative solution can be used, like Hall effect sensors, MR Devices, GMR devices, or other alternatives that are capable to measure the absolute magnetic field strength. However, to maintain the benefit of building a very robust active sensing module, it may be advantageous to avoid including any active semiconductor components. The core of the magnet field sensing device 40 may be of a permeable amorphous elongated element 42. As mentioned above, the magnetic field sensing arrangement may alternatively realized by a shunt resistor 40, 44 being connected in series to the generator coil arrangement 20, as will be described in detail in FIGS. 5, 6 and 8.

Figure 3:
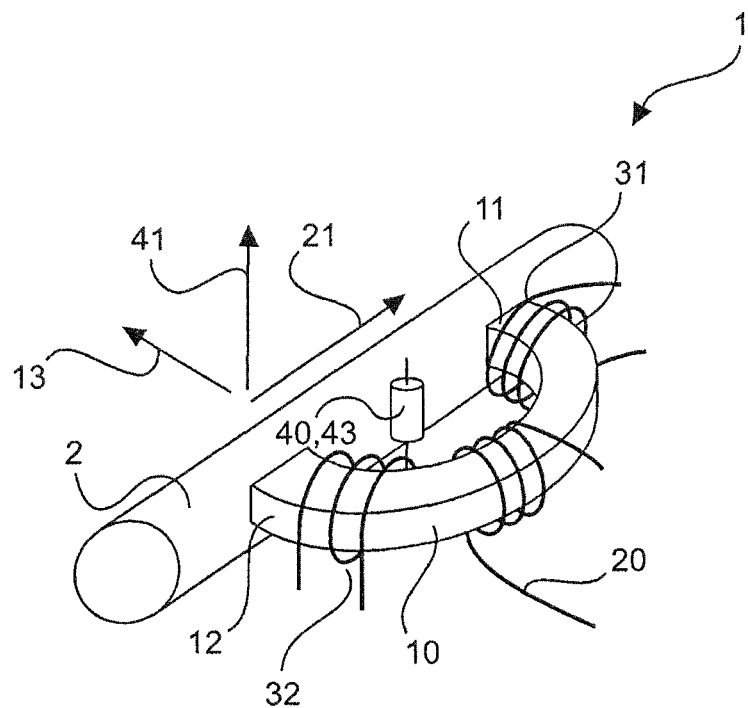
FIG. 3 illustrates a perspective view of an exemplary embodiment of an active sensing module.

FIG. 3 illustrates a perspective view of a force measuring device 1. The flux concentrator 10, here in form of a horse shoe has a first end 11 with a first pole face and a second end 12 with a second pole face. The first and second pole faces are oriented into a facing direction 13 toward the object to be measured 2. The generator coil of the magnetic field generating coil arrangement 20 is wound around the flux concentrator 10. Also the distance sensing arrangement 30, in particular the first and the second distance sensing coils 31, 32 are wound around the flux concentrator 10. The first and the second distance sensing coils 31, 32 are wound around the pole and 11 and 12 of the flux concentrator 10. The generator coil 20 generates a magnetic field between the pole shoes 11, 12 into the generating field direction 21. The magnetic field sensing device 40 in form of a coil 43 is oriented traverse to the generating field direction, so that the main sensing direction 41 is e.g. orthogonal to the main field generating direction 21.

Figure 4:
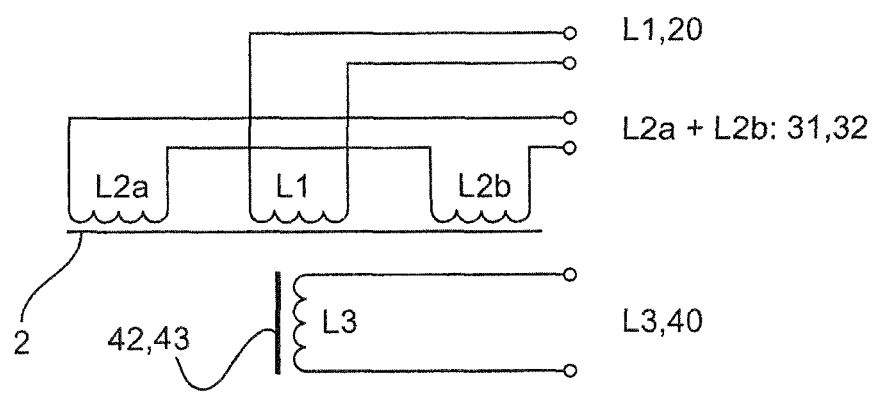
FIG. 4 illustrates a circuitry of an exemplary embodiment of an active sensing module.

FIG. 4 illustrates an active sensing module 3 of the active mechanical force sensor 1 comprising three functions, all related to either generate or to detect and measure magnetic fields. L1, 20 is the magnetic field generating coil, L2, 30 (L2a, 31+L2b, 32) and L3, 40 are magnetic field sensing devices. In this figure L3, 40 is an inductor 43 with core, suitable for a flux gate sensing solution. However, L3 can be replaced by another magnetic field sensing (MFS) device. In this specific application, the MFS device, e.g. a flux gate device, will receive the magnetic information that is coming not only from the test object 2, but also from signals (or values) created by other magnetic field sources. The signal received by this MFS device is affected or influenced and manipulated by the following operational circumstances (listed in order as affected with):

Carrier signal that is generated and transmitted by the magnetic field generator coil 20, built in the active sensing module 3

Magnetic field stored in the test object 2 or magnetic stray field of a certain magnitude Distance between the active sensing module 3 and the surface of the test object 2 (Air gap)

Mechanical force that is applied to the test object 2.

Only the latter is the effect which may be of interest, whereas the remaining three effects may be considered as disturbing effects.

The generator coil arrangement in particular embodiments can be replaced by a signal generator 20 being capable of generating a constant magnetic field. In other words, the signal generator 25 can be either a constant voltage (or a constant/direct current: DC), or it can be an alternating voltage (or alternating current) generator. When using a constant voltage (or a constant current) the magnetic field generated at the two poles of the flux concentrator have the ability to "magnetize" the test object, e.g. the shaft from where the mechanical forces will be measured. This will cause a drifting signal offset and/or a signal hysteresis when measuring the forces. This will not occur when using alloys that have no magnetic retention feature. When using an alternating current (or an alternating voltage) to drive the generator coil then the test object will not be magnetized. In addition the AC driven system is largely immune to magnetic stray fields (like the earth magnetic field) that may surround the sensor system.

Figure 5:
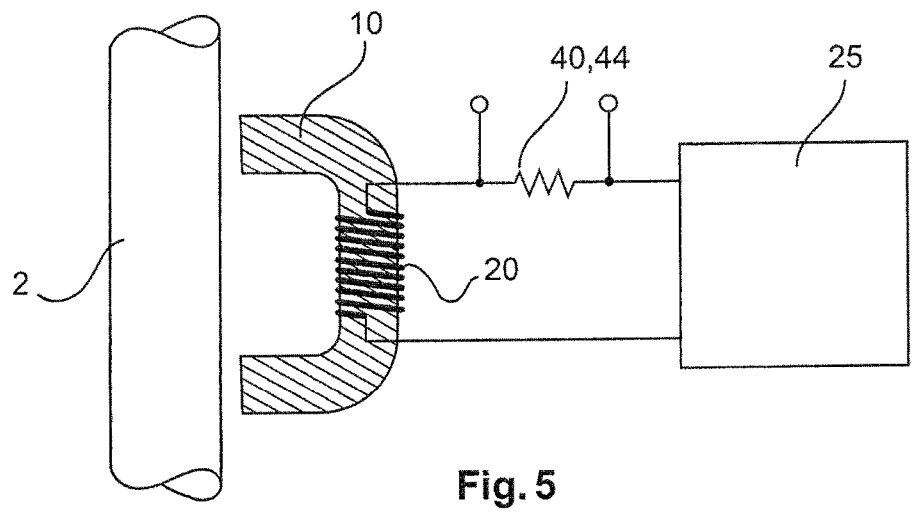
FIG. 5 illustrates an alternative exemplary embodiment having a shunt resistor as magnetic field sensing arrangement.

FIG. 5 illustrates an alternative sensor design. The simplified sensing module 3 requires only one coil 20 being wound around the flux concentrator. There is no need for a separate magnetic field sensing device between the pole shoes of the flux concentrator 10. Instead, a magnetic field sensing device in form of a current meter or shunt resistor is provided. The magnetic field sensing shunt resistor 44 is connected in series to the generator coil 20. The measurement signal can be gained from the terminals of the shunt resistor 44. The mechanical force measurement signal will be taken from the in-line resistor 44. The sensor signal will then be passed forward to the signal conditioning and signal processing module, in general the sensor electronics 4.

Figure 6:
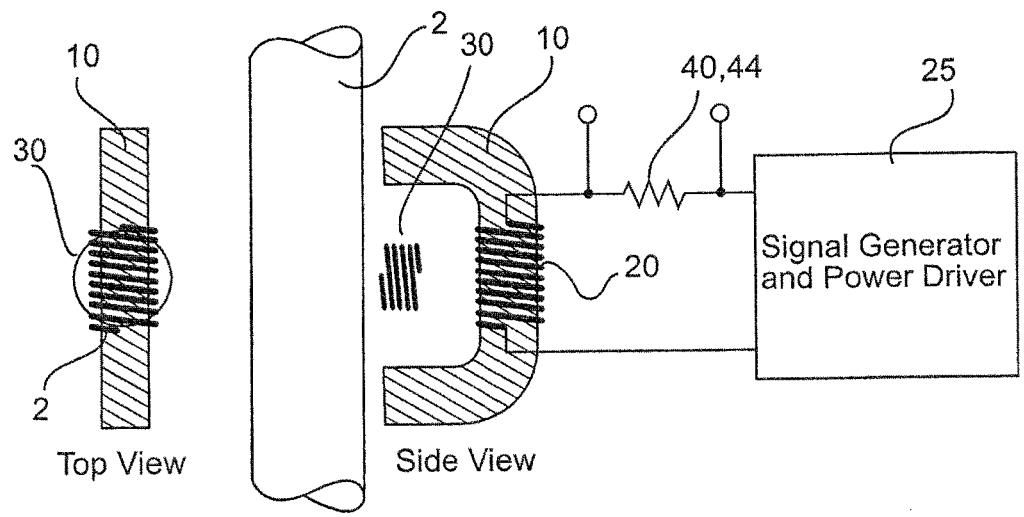
FIG. 6 illustrates an alternative exemplary embodiment of FIG. 5 having a distance sensing arrangement between the pole ends of the flux concentrator.
Figure 8:
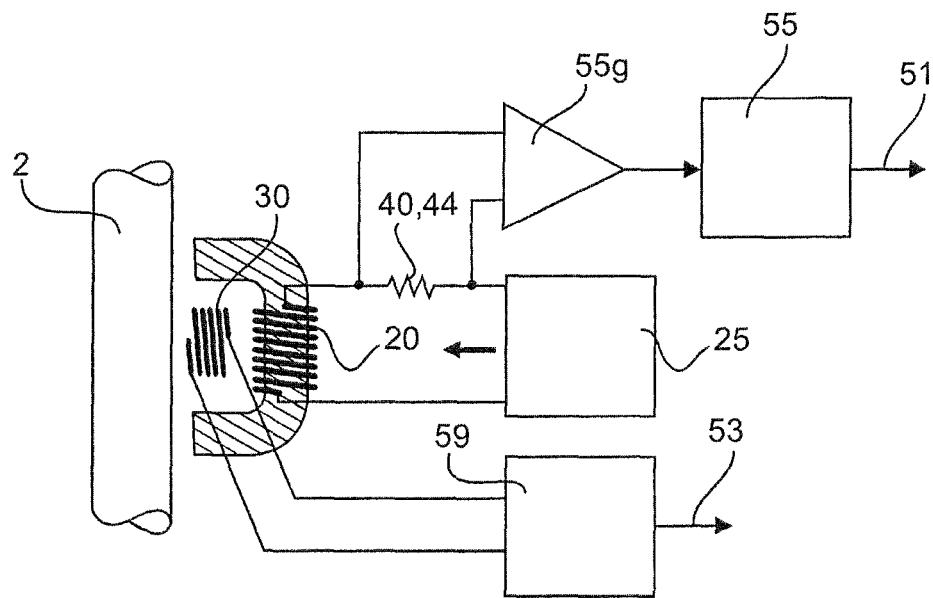
FIG. 8 illustrates an alternative exemplary embodiment of FIG. 6 with sensor electronics.

FIG. 6 illustrates a force measurement device having a distance measurement unit 30, where the distance sensor 30 is no longer part of the coils wound around the flux concentrator 10. The right hand part of the FIG. 6 illustrates the side view of the force measurement device together with an object to be sensed 2. The left hand part of FIG. 6 illustrates a top view without the object 2. It should be noted that the distance sensing unit 30 may be formed separately from the sensing module unit and may operate on an entirely different measurement principle. Instead of a coil also a standard proximity sensor or a laser distance detector may be used. In FIG. 6 an inductor (coil) is placed flat to the test object 2 parallel to the surface of the test object which may be a shaft. The distance sensor may have its own signal processing circuit, as can be seen in FIG. 8. The distance sensor may electronically not linked to the features and functions of the sensing module unit having the concentrator 10 and the generator coil 20. However, the distance sensor has to be mechanically linked to the sensing module unit. The distance sensing module may operate on a different frequency then the force sensing module to avoid unwanted signal interferences. This way any frequency can be chosen as the distance sensor, as it no longer depends on the signal driver of the sensing module.

Figure 7:
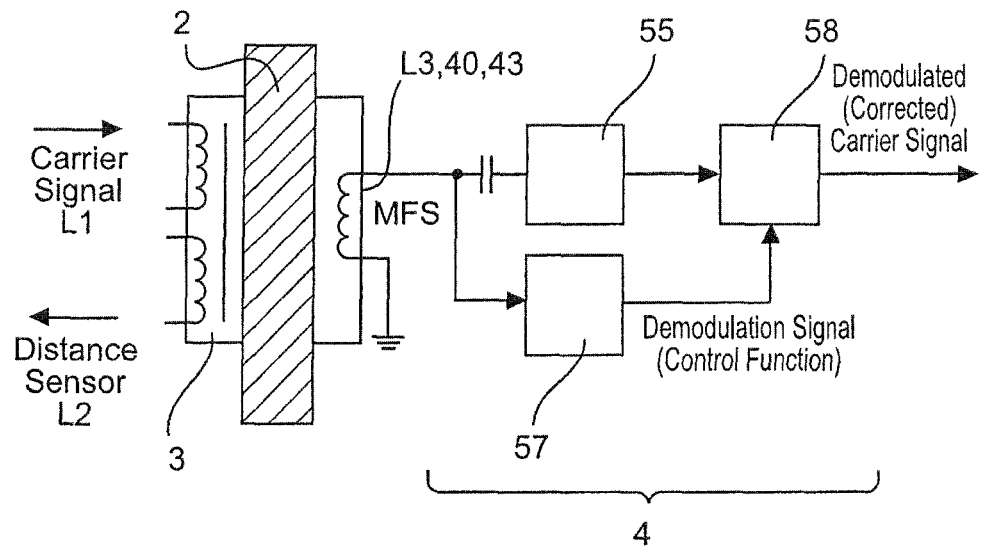
FIG. 7 illustrates a schematic overview of an exemplary embodiment of an active sensing module with an evaluation unit/sensor electronics.

FIG. 7 illustrates the evaluation of the sensor electronics 4. The actual effect of the mechanical forces to be measured is an additional signal amplitude modulation on top of the other mentioned before. So, to extract the targeted signal caused by mechanical forces applied to the test object 2, the effects of all the other interfering factors, e.g. magnetic stray fields, the distance to the test object, and others have to be removed first. When measuring with the MFS device the absolute magnetic field strength that is received with this sensor design, then the output of the first stage of the sensors signal conditioning electronics, e.g. either a simple buffer or a flux gate stage, shows the generators carrier signal, strongly amplitude modulated caused by magnetic stray fields of various sources, but mainly by magnetic fields that emanates from the test object and ferro magnetic objects placed nearby, and further amplitude modulated by the absolute distance between the sensing module 3 and the surface of the test object 2. The sensor device 1 further comprises a signal generator 25 for driving the field generator coil L1, 20 so as to generate a magnetic field into the main generating direction 21.

When using an absolute measuring MFS device 40 then this sensing element will detect and measure the amplitude of the carrier signal, and it will measure the presence of magnetic stray fields. While the carrier signal is a frequency and can be passed on to the next signal processing stage using a capacitor only, acting as a high pass filter, the magnetic stray field is a DC signal or a low frequency signal. It is important to know the magnetic flux direction of the interfering magnetic stray field, which is why it has to be measured as absolute value and therefore cannot be coupled to the next electronic circuit stage using a capacitor, for example.

For a high quality performance of the active mechanical force sensor it is important that the chosen MFS device 40 is designed in such way that it will pick up a magnetic field signal that comes from one specific direction, i.e. having a very small field detection angle. If the chosen MFS device 40 has a relative wide magnetic field detection angle, as it is typical by Hall effect sensors, it will become more difficult to cancel out the unwanted effects of the magnetic stray fields. A good choice for a MFS device is an elongated inductor 40 with amorphous wire core 42. The capability to identify the exact direction from where the interfering magnetic signal is coming from is superb.

The magnetic stray field detected and measured by the MFS device will then result into information that contains the signal strength and the polarity of the magnetic stray field. While an increasing and positive signal amplitude of the stray field information means that it will cause a positive signal amplitude modulation of the carrier signal (will become larger), an increasing and negative signal amplitude of the stray field means it will cause a negative signal amplitude of the carrier signal (will become smaller in value). In FIG. 5, the sensed signal will enter the first branch 51 and the second branch 52 of the evaluation unit 4. When entering the first path, the signal will pass the capacitor operating as a high pass filter to arrive at the signal processing unit 55 of the first branch. When entering the second branch, the signal will arrive at the signal processing unit 57. The demodulated signal being output by the signal processing unit 57 of the second branch as well as the output of the signal processing unit 55 of the first branch will enter the amplitude demodulation unit 60 for amplitude demodulation and further enter the further signal processing unit 61 so as to achieve a demodulated sensor signal at the exit of the sensor electronics 4. It should be noted that with the general build up of the device of FIG. 7, the magnetic field sensing arrangement 40 in form of a coil 43, L3 can also be replaced by a shunt resistor (not shown) being connected in series with the coil L1 of the generator coil arrangement 20, as will be described in FIG. 8.

There are several ways to achieve the carrier signal amplitude de-modulation, which can be done by either using pure analogue signal processing solutions, pure digital signal processing solutions, or by using mixed signal processing circuit designs.

FIG. 8 illustrates the device of FIG. 6 with connected sensor electronics or evaluation unit 4. The distance coil 30 is connected to the third branch 53, so that the signal from the coil 30 is fed to a signal processing 59. The measured signal form the shunt resistor 44 is fed to an instrument amplifier 55g, so that the signal can be amplified before further signal processing in the first branch signal processing and amplitude demodulation unit 55. The result then may be fed to a computer 60 for further signal processing, including correction and compensation of signal amplitudes.

Figure 9:
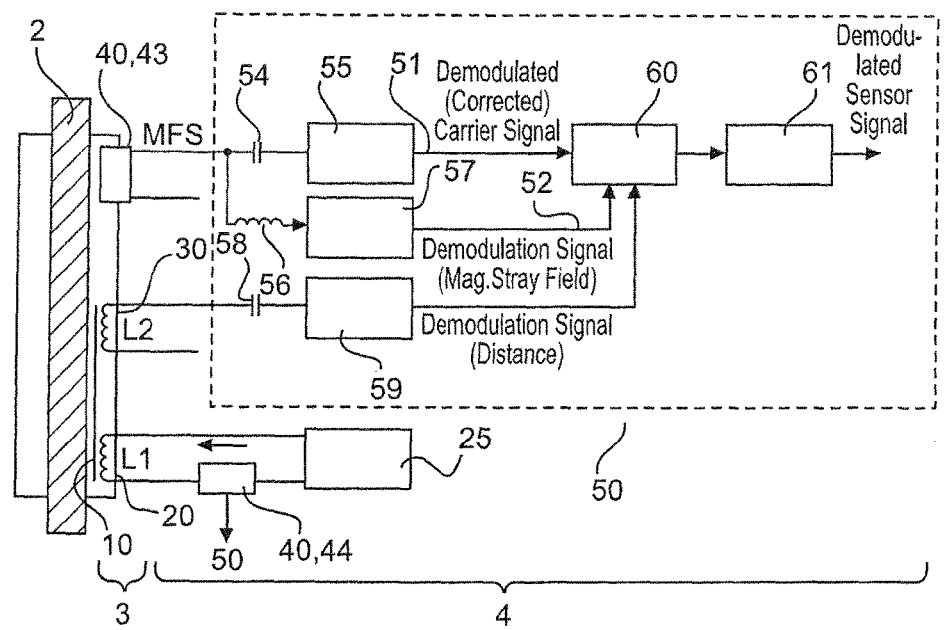
FIG. 9 illustrates a schematic overview of an exemplary embodiment of an active sensing module with an evaluation unit/sensor electronics considering a distance measurement.

FIG. 9 illustrates a further exemplary embodiment of the invention. FIG. 9 in particular illustrates that the total sensor electronics may be designed more complex as the carrier signal may need to be generated first by the generator coil driver 25 (here called: generator signal), and the received signals may need to be filtered, amplified, and several times demodulated, before it can be processed further. The block diagram of FIG. 6 shows only the patent application relevant part of the required circuitry. The term "demodulation signals" represents the control signal required by the signal amplitude demodulation circuit to execute correctly the amplitude demodulation. The carrier signal will be demodulated two times, namely to compensate for magnetic stray fields, and then to compensate the distance between the module 3 and the object 2. The computer 60 serves for correction and compensation of signals, if required. In particular, the signals of the first branch 51, the second branch 52 and the third branch 53 can be adapted to be in the right ration, before it can be further processed in unit 61 to extract the actual mechanical force measurement signals. Further processing unit 61 may e.g. provide a further amplifier, a polarity converter and or a digital to analogue converter, if required. The specific active mechanical force sensor solution as described above is measuring the deflection of the carrier signal magnetic field at the surface of the test object 2. To do so, a carrier signal is generated by a magnetic field generator comprising a respective electronics circuit 25 in combination with a generator coil 20, L1. This carrier signal is inserted with the help of a magnetic yoke 10 into the test object 2 at the sensing region. The magnetic field sensing device 40, here also denoted as L3, is measuring the magnetic field that is detectable at the surface of the test object 2, placed nearest to the active sensor module 3. Under certain circumstances, the magnetic field lines, here in the direction 21, that are detected by the MFS device 40, L3 will be affected by a movement of the test object 2. In such unfortunate case, the field lines, originally in the direction 21 will slightly rotate in one or the other direction, which results in an increase or decrease of the signal amplitude of the received carrier signal. With other words, the carrier signal will experience a signal amplitude modulation in relation to the speed with which the test object 2 is moving in relation to the sensing module 3. When the test object 2 is moving in relation to the sensing module 3 like linear movements or rotational movements, then, under certain circumstances, the sensor output signal will be affected by this. The reason for this to happen is, when the actively generated carrier signal will cause a certain amount of eddy currents in the setup between active sensing module 3 and test object 2. There are a number of reasons that eddy currents with a potential to affect the sensor signal may happen, of which the most important reasons are listed as follows.

Physical size of the sensing module: The active sensing module is very small in size so that the magnetic field sensing device 40 (here also denoted as L3) has to be placed to closely to the yoke, which yoke 10 is used to generate the carrier signal. As the eddy currents are strongest where the yoke heads 11, 12, i.e. magnetic pole heads of the field generator, facing the test object 2, the MFS device 40 has to keep some distance to the yoke heads 11, 12.

Operational frequency of the carrier signal: The lower the operational frequency of the magnetic field generator 25, 20 will be, the stronger the development of the unwanted eddy current will be. A suitable frequency is above 4000 Hz carrier frequency to reduce the effects of the eddy current. Under certain design criteria it may be inviting to use a carrier frequency of less than 1000 Hz. While this may have positive effects on the to be measured sensor signals, it may have a opposing effect of the creation of eddy currents. The presences of the eddy currents make the sensor increasable sensitive to linear or rotational movements.

Yoke been tooled from conductive material: Using electrical conductive material for the yoke (part of the carrier signal, magnetic field generator) will have two effects: First the operational frequency of the magnetic field generator may have to be reduced to below 1000 Hz, and second, conductive material likes to generate eddy currents when alternating magnetic fields are passed through. To reduce and to fully eliminate the unwanted effects of eddy currents to interfere with the mechanical force measurements, the following has to happen (in various ratios):

Avoiding use of electric conductive material for the yoke 10, as the yoke is the part of the magnetic field generator. A good solution is ferrite materials that conduct magnetic field lines very well owing to high permeability, but do not conduct electric currents.

Assuring that the operational frequency of the Magnetic Field Generator is well above 1000 Hz. To eliminate the unwanted effects of eddy currents the operational frequency may have to be above 4000 Hz. A good working frequency may be 8000 Hz. In particular application, such frequencies are applicable when using ferrites as the yoke 10.

Avoiding building very small sensing modules, where the magnetic field sensing device 40, L3 is placed too closely to the pole heads 11, 12. The negative effect of the sensors sensitivity towards movements of the test object 2 will also increase when the air gap (spacing) between the sensor module 3 and the test object surface will be increased. Best is to build the sensing module large enough e.g. 20 mm wide, and to keep the distance between the sensing module 3 and the test object 2 e.g. below or at 1 mm.

As illustrated in FIG. 9, the magnetic field sensing arrangement 40 in form of a coil 43 can be replaced by a shunt resistor 44, also being connected to the evaluation unit 50. FIG. 9 illustrates magnetic field sensing arrangement on both locations. However, it should be understood that the magnetic field sensing arrangement 40 can be either the coil 43 or the shunt 44. As an alternative also both magnetic field sensing arrangements can be applied, e.g. for providing a redundant measurement.

As mentioned, these three critical sensor design criteria can be combined in various ratios to meet important mechanical design goals. For example, when it is absolutely important to build a very small sensing module, then the solution may be:
  Using non conductive and magnetic material for the yoke. The material chosen may have to have a high magnetic permeability.
  The operational frequency for the magnetic field generator may have to be well over 4000 Hz, e.g. about 8000 Hz.
  Using band pass filter with a high Q (high quality) to filter the carrier frequency, e.g. 8000 Hz, to avoid that any other signal interference will be processed further.

Summary: As the most relevant sensor design information may be considered: Using non conductive, high magnetic permeability materials for the yoke, the use of an generator frequency above 4000 Hz, and to avoid placing the magnetic field sensing device L3, 40 to close to the magnetic poles of the yoke.

The signal sensed by the magnetic field sensing arrangement 40 will be fed to the sensor electronics 4 or evaluation unit 50. In particular, the signal of MFS device 40 will be fed to the first branch 51 of the sensor electronics and to the second branch 52 of the sensor electronics. The signal in the first branch 51 passes a high pass filter, e.g. in form of a capacitor 54. The signal in the second branch 52 passes a low pass filter, e.g. in form of an inductance. The signal in the first and the second branch each enter a respective signal processing unit 55 in the first branch and signal processing unit 57 in the second branch. The signal in the first branch 51 and the demodulated signal in the second branch both enter the amplitude demodulation unit 60. A further processing will be conducted in unit 61 so as to achieve the demodulated sensor signal. The evaluation unit 50 may have a third branch 53, as can be seen in FIG. 6. The signal from the distance sensing coil arrangement 30, 31, 32 will be fed to the third branch 53. The signal passes a high pass filter 58 in the third branch 53 and then enters a signal processing 59. The demodulated signal of the third branch 53 then will be fed to the amplitude demodulation unit 60.

Figure 10:
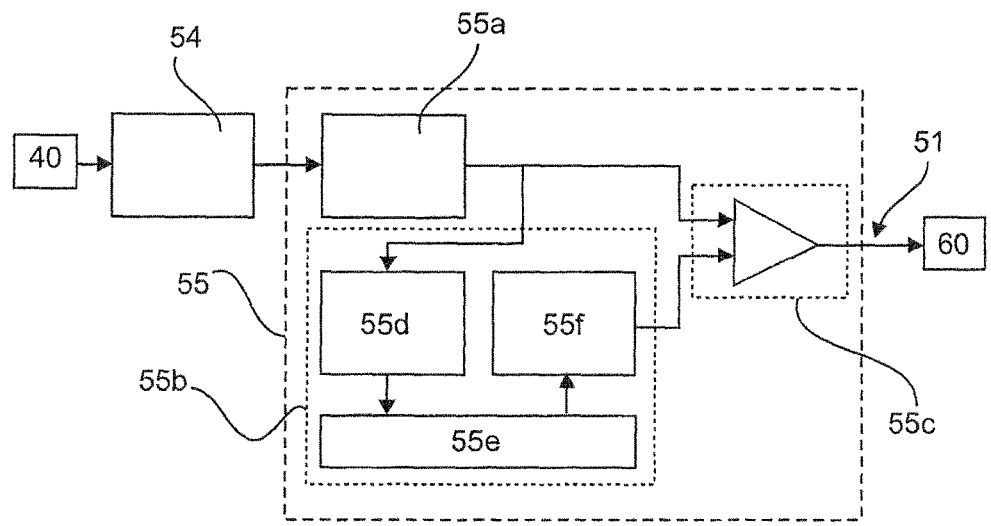
FIG. 10 illustrates an exemplary detailed build up of a signal processing and demodulating branch in the sensor electronics.

FIG. 10 illustrates an exemplary detailed build up of the signal processing and amplitude demodulating unit 55.

Although described in connection with the signal processing and amplitude demodulation unit 55 of the first branch 51, the same applies mutatis mutandis to the signal processing and amplitude demodulation units 57 and 59 of the second branch 52 and the third branch 53. The signal of the magnetic field sensing arrangement 40 enters a filter 54 (mutatis mutandis filters 56 and 58, see FIG. 9). The filter may be a high pass filter, e.g. being realized by a capacitor. As an alternative filter 54 can be designed as a digital filter in form of a band pass or brick filter. The filters 56 and 58 may be adapted accordingly with respect to the frequency. Then the signal enters the signal processing and amplitude demodulation unit 55 of the first branch 51. The signal processing and amplitude demodulation unit 55 according to an exemplary embodiment comprises a true root mean square (RMS) converter, a constant voltage source 55b and a subtracting amplifier 55c. The alternating signal composed of carrier portion and a force signal portion is fed to the RMS and will be converted into a direct current signal. The true RMS converter circuit is responsible to rectify the AC sensor carrier-signal and to provide a reliable and stable DC signal that corresponds to the true AC signal amplitude only. To eliminate the zero-force signal amplitude, a subtracting amplifier is used. With a stable and programmable reference voltage the zero-force measurement signal will be subtracted. Only the signal changes will pass through the subtracting amplifier that are caused by mechanical force changes which results in an amplitude change of the carrier signal. For this purpose, the output signal of the true RMS converter will be fed to a first inlet of the subtraction amplifier 55c. The constant voltage source, also denoted as reference voltage source feeds a constant voltage corresponding to the carrier portion of the signal to a second input of the subtracting amplifier 55c. The subtracting amplifier subtracts the carrier portion from the direct current signal so as to achieve the force component of the direct current signal. Thus, the signal is demodulated from the carrier part of the measured or sensed signal. The carrier portion may be determined by measuring the force measuring signal without any applied force.

The constant voltage source may be a preset voltage source. However, the voltage source may also be an adaptable voltage source. The adaption may be carried out by manually adjusting the reference voltage, e.g. via a potentiometer, until the output of the subtraction amplifier 55c is zero when having applied no force to the object 2.

As an alternative, the constant voltage source 55b may include an analogue to digital converter ADC 55d for converting the direct current signal at the exit of the true RMS converter 55a into a digital signal. This digital signal may be fed to a microcomputer unit MCU being connected to the ADC. Thus the MCU may determine the carrier portion from the direct current signal when applying no force to the object. This signal can be converted by a digital to analogue converter DAC 55f, which may be connected to the MCU. The converted signal can be fed from the DAC to the second input of the subtraction amplifier 55c. The output of the subtraction amplifier, i.e. the demodulated signal being the pure force related signal, can be fed to the computer 60 for further processing, as described with respect to FIG. 9.

Figure 11:
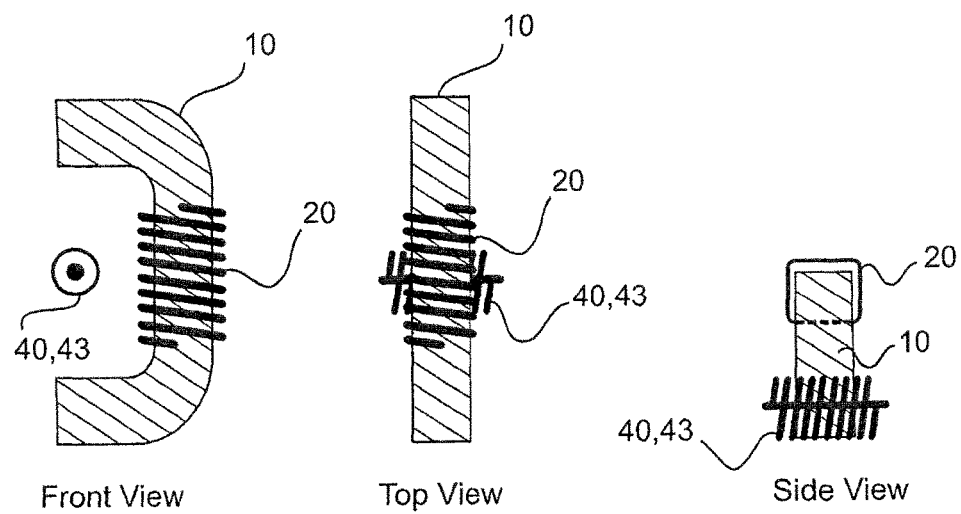
FIG. 11 illustrates an exemplary embodiment with a flux gate circuit and a sensing coil traverse to the orientation of the flux concentrator.

FIG. 11 illustrates a magnetic field sensing arrangement 40 in form of coil 43. This coil 43 may be part of a flux gate circuit. The coil 43 is turned by 90 degree in relation to the main orientation of the flux concentrator 10. Otherwise the signal generated within the flux gate circuit will drive the circuit into saturation. When placed exactly 90 degree in relation to the flux concentrator direction, then there is nearly no carrier signal to be detected (which is good). As soon as mechanical forces are applied to the test object 2, then the signal amplitude changes of the carrier signal can be easily detected and measured at the output of the flux gate circuit. When using a flux gate circuit as the magnetic field sensing device, then the magnetic field generating coil 20 can be powered (driven) by an AC or an DC signal.

Figure 12:
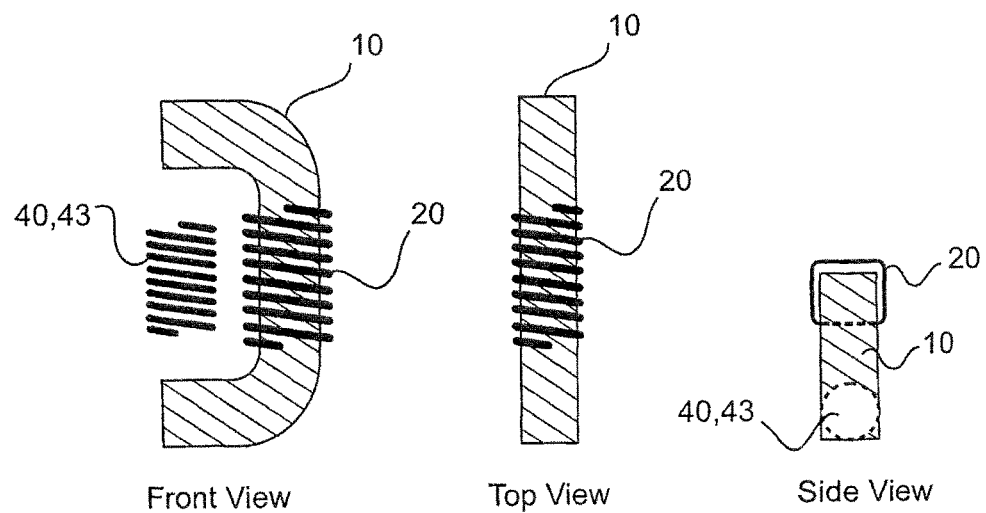
FIG. 12 illustrates an exemplary embodiment without a flux gate circuit and a sensing coil in the same orientation as the orientation of the flux concentrator.

FIG. 12 illustrates a magnetic field sensor device 40 in form of a plane inductor 43 (with or without a core), which however is not part of a flux gate. In this specific case it is possible to place the coil 43 in the same axis as the flux concentrator 10 is oriented. The carrier signal will be very large in relation to the signal amplitude modulation of the signal that can be measured at the two terminals of the magnetic field sensing device. It should be noted that this sensing module design (using a standard inductor, placed as shown in FIG. 12) can be used only when the magnetic field generator coil is driven by an AC signal.

It should be noted that the term 'comprising' does not exclude other elements or steps and the 'a' or 'an' does not exclude a plurality. Also elements described in association with the different embodiments may be combined.

It should be noted that the reference signs in the claims shall not be construed as limiting the scope of the claims.

REFERENCES 1 force measuring device
2 ferromagnetic object
3 active sensing module
4 sensor electronics/evaluation unit
10 flux concentrator
11 first end of flux concentrator
12 second end of flux concentrator
13 facing direction of pole faces on first/second end of flux concentrator
20 magnetic field generation coil arrangement
21 main generating direction of magnetic field
25 generating coil driving unit
30 distance sensing coil arrangement
31 first distance sensing coil
32 second distance sensing coil
40 magnetic field sensing arrangement
41 main detecting direction
42 permeable amorphous elongated element
43 magnetic field sensing coil
44 magnetic field sensing shunt resistor
50 evaluating unit
51 first branch of evaluating unit
52 second branch of evaluating unit
53 third branch of evaluating unit
54 first filter of first branch
55 signal processing and amplitude demodulation unit of first branch
55a true root mean square (RMS) converter
55b constant voltage source
55c subtracting amplifier
55d analogue/digital converter ADC
55e microcomputer unit (MCU)
55f digital/analogue converter (DAC)
55g instrumentation amplifier
56 second filter of second branch
57 signal processing and amplitude demodulation unit of second branch
58 third filter of third branch
59 signal processing and amplitude demodulation unit of third branch
60 common signal processing computer
61 further signal processing

The invention claimed is:

1. A force measuring device for measuring a force impact onto a ferromagnetic object, comprising:
   a flux concentrator having a first end and a second end, the first end and the second end facing the ferromagnetic object to be measured;
   a magnetic field generating coil arrangement being wound around the flux concentrator, the magnetic field generating coil arrangement configured to generate a magnetic field having a main generating direction between the first end and the second end;
   a magnetic field sensing arrangement producing a measurement signal being indicative for a force applied to the object to be measured; and
   an evaluating unit evaluating a sensing signal of the magnetic field sensing arrangement, the evaluating unit including a first branch for entering the sensing signal of the magnetic field sensing arrangement, the first branch having a first filter having a passing characteristic matching the generating current frequency driving the magnetic field generating coil arrangement, and a subsequent signal processing unit for evaluating the sensing signal in view of the applied force to the ferromagnetic object to be measured, the signal processing unit including a true root mean square converter into which the filtered signal enters, a reference voltage source providing a reference voltage corresponding to the force free measurement signal, and a subtracting amplifier subtracting the reference voltage from an output of the true root mean square converter.

2. The force measuring device according to claim 1, wherein the magnetic field sensing arrangement includes a magnetic field sensing coil being arranged between the first end and the second end and wherein the measuring signal is gained from terminals of the magnetic field sensing coil.

3. The force measuring device according to claim 2, wherein the magnetic field sensing coil has a main detecting direction being inclined to the main generating direction.

4. The force measuring device according to claim 3, wherein the magnetic field sensing coil has a main detecting direction being inclined by 90° to the main generating direction and a facing direction.

5. The force measuring device according to claim 1, further comprising:
   a distance sensing coil arrangement adapted to sense a distance between the force measuring device and the object to be measured, so that a measured force signal can be distance compensated.

6. The force measuring device according to claim 5, further comprising:
   a first distance sensing coil wound around the flux concentrator and arranged at the first end of the flux concentrator; and
   a second distance sensing coil wound around the flux concentrator and arranged at the second end of the flux concentrator.

7. The force measuring device according to claim 5, wherein the distance sensing coil arrangement is arranged between the first end and the second end of the flux concentrator.

8. The force measuring device according to claim 1, wherein the magnetic field sensing arrangement is a fluxgate circuit having a core material of a permeable amorphous elongated element.

9. The force measuring device according to claim 8, wherein the relative permeability of the permeable amorphous elongated element is above 70,000.

10. The force measuring device according to claim 1, wherein the magnetic field sensing arrangement is a magnetic field sensing shunt resistor connected in series to the magnetic field generating coil arrangement and wherein the measuring signal is gained from terminals of the magnetic field sensing shunt resistor.

11. The force measuring device according to claim 1, wherein the magnetic field sensing arrangement includes a magnetic field sensing coil wound around the flux concentrator and wherein the measuring signal is gained from terminals of the magnetic field sensing coil.

12. The force measuring device according to claim 1, further comprising:
a generating coil driving unit configured to drive the magnetic field generating coil arrangement with a current having a frequency above a frequency where eddy currents occur in the ferromagnetic object to be measured.

13. The force measuring device according to claim 12, wherein the frequency of the current is higher than 600 Hz.

14. The force measuring device according to claim 1, wherein the evaluating unit includes:
a second branch entering the sensing signal of the magnetic field sensing arrangement, the second branch having a second filter having a low pass characteristic matching a frequency of a permanent magnetic field of the ferromagnetic object to be measured and
a subsequent signal processing unit evaluating the sensing signal in view of the permanent magnetic field of the ferromagnetic object to be measured.

15. The force measuring device according to claim 14, wherein the low pass filter characteristic of the second filter matches a rotation frequency of the ferromagnetic object to be measured.

16. The force measuring device according to claim 14, wherein the evaluation unit is adapted to determine an applied force to the ferromagnetic object to be measured based on an evaluation result of the first branch and an evaluation result of the second branch.

17. The force measuring device according to claim 1, wherein the evaluating unit includes:
a third branch entering a distance sensing signal of the distance sensing coil arrangement, the third branch being adapted to evaluate the distance of first end and the second end, respectively, to the ferromagnetic object to be measured.

18. The force measuring device according to claim 17, wherein the evaluation unit is adapted to determine an applied force to the ferromagnetic object to be measured based on an evaluation result of the first branch and an evaluation result of the third branch.

19. A method for measuring a force, comprising:
applying the force to an object to be measured;
generating a magnetic field toward an object to be measured by a magnetic field generating coil arrangement being wound around a flux concentrator having two ends facing the object to be measured;
measuring an electric field by a magnetic field sensing arrangement so as to achieve a measurement signal being indicative for the applied force;
filtering the measurement signal with respect to impacts on the measurement signal of at least one of a stray field of the not-degaussed object to be measured, a magnetic field resulting from the generation of an magnetic field by the magnetic field generating coil arrangement and a distance between the ends of the flux concentrator and the object to be measured;
demodulating an amplitude of the filtered measured signal, so as to remove the impact of at least one of the stray field, the generated field and the distance, respectively by amplitude demodulation;
entering the filtered measured signal into a true root mean square converter;
providing, by a reference voltage source, a reference voltage corresponding to a force free measurement signal; and
subtracting, by a subtracting amplifier, the reference voltage from an output of the true root mean square converter.

* * * * *